(12) United States Patent
Cha et al.

(10) Patent No.: US 7,761,472 B2
(45) Date of Patent: Jul. 20, 2010

(54) INDEXING SYSTEM AND METHOD FOR NEAREST NEIGHBOR SEARCHES IN HIGH DIMENSIONAL DATA SPACES

(75) Inventors: Guang-Ho Cha, Pusan (KR);
Chin-Wan Chung, Taejon (KR);
Dragutin Petkovic, Saratoga, CA (US);
Xiaoming Zhu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 343 days.

(21) Appl. No.: 11/869,189

(22) Filed: Oct. 9, 2007

(65) Prior Publication Data
US 2008/0033937 A1    Feb. 7, 2008

Related U.S. Application Data

(63) Continuation of application No. 09/512,949, filed on Feb. 25, 2000, now Pat. No. 7,318,053.

(51) Int. Cl.
*G06F 17/30* (2006.01)
*G06F 7/00* (2006.01)

(52) U.S. Cl. .................................................. 707/788
(58) Field of Classification Search ........................ None
See application file for complete search history.

(56) References Cited

U.S. PATENT DOCUMENTS

| | | | | |
|---|---|---|---|---|
| 5,144,679 A | * | 9/1992 | Kakumoto et al. | 382/113 |
| 6,263,334 B1 | * | 7/2001 | Fayyad et al. | 707/5 |
| 7,318,053 B1 | * | 1/2008 | Cha et al. | 707/1 |

* cited by examiner

*Primary Examiner*—Sathyanarayan Pannala
(74) *Attorney, Agent, or Firm*—John L. Rogitz

(57) ABSTRACT

Vectors representing objects in n-dimensional space are approximated by local polar coordinates on partitioned cells of the data space in response to a query, e.g., a query data vector entered with a request to find "k" nearest neighbors to the query vector. A set of candidate near neighbors is generated using the approximations, with the local polar coordinates being independent of the dimensionality of the data space. Then, an answer set of near neighbors is returned in response to the query. Thus, the present invention acts as a filter to reduce the number of actual data vectors in the data set that must be considered in responding to the query.

1 Claim, 5 Drawing Sheets

(STAGE 1)

(STAGE 1)

(STAGE 2)

INDEXING SYSTEM AND METHOD FOR NEAREST NEIGHBOR SEARCHES IN HIGH DIMENSIONAL DATA SPACES

This is a continuation of allowed U.S. patent application Ser. No. 09/512,949, filed Feb. 25, 2000 now U.S. Pat. No. 7,318,053, from which priority is claimed.

BACKGROUND OF THE INVENTION

1. Field of the Invention

The present invention relates to methods and systems for indexing objects in high dimensional data spaces to respond to user queries.

2. Description of the Related Art

Nearest neighbor searching on high dimensional data spaces is essentially a method of searching for objects in a data space that are similar to a user-selected object, with the user-selected object defining a query. For example, using the present assignee's QBIC system, a user can select a digital image and use the image as a query to a data base for images that are similar to the user-selected digital image. In response to the query, the "k" closest images are returned, where "k" is an integer defined by the user or search engine designer. These "k" images are referred to as the "k" nearest neighbors to the image that was used as the query, and for indexing and search purposes they are typically considered to be multidimensional data points "p" that are close to a multidimensional data point "q" representing the query. Other non-limiting examples of applications that use nearest neighbor searching include video databases, data mining, pattern classification, and machine learning.

In any case, multidimensional indexing methods ("MIMs") have been introduced for indexing multidimensional objects by partitioning the data space, clustering data according to the partitioning, and using the partitions to prune the search space to promote fast query execution. It will readily be appreciated that in the context of large databases that hold a high number of objects, the time to execute a query like the one discussed above would be excessive in the absence of MIMs. As recognized by the present invention, while effective for low dimensionalities, MIMs are not effective and indeed tend toward being counterproductive for objects having high dimensionalities, e.g., of ten, twenty or more. Image objects, for example, can have hundreds of dimensions, and text documents can have thousands of dimensions.

Weber et al. disclose a filtering method intended to be an improvement over conventional MIMs in "A Quantitative Analysis and Performance Study for Similarity-Search Methods in High-Dimensional Spaces", *Proc. of the 24th Int'l Conf. on VLDB*, 1998 ("VA file" method). In the VA file method, compact approximations of data objects (also referred to as "vectors") are generated, and by first scanning the compact approximations, a large number of the larger actual vectors can be filtered out such that only a small number of vectors need be examined. In this way, query execution time is minimized.

The present invention has recognized, however, that the VA file method has at least two drawbacks. The first is that as the dimensionality of the data objects increases, the number of bits used in the approximations also increases significantly to facilitate adequate filtering. This means that the performance of the VA file method, like the performance of the above-mentioned MIMs, degrades significantly when applied to high dimensional data spaces (e.g., dimensions over 100).

The second drawback with the VA file method is that its filtering capability decreases in the case of clustered data such as multimedia data. The present invention, having recognized the above-noted deficiencies in the prior art, has provided the improvements disclosed below.

SUMMARY OF THE INVENTION

The invention is a general purpose computer programmed according to the inventive steps herein. The invention can also be embodied as an article of manufacture—a machine component—that is used by a digital processing apparatus and which tangibly embodies a program of instructions that are executable by the digital processing apparatus to undertake the present invention. This invention is realized in a critical machine component that causes a digital processing apparatus to perform the inventive method steps herein. The invention is also a computer-implemented method for undertaking the acts disclosed below.

Accordingly, a computer is programmed to undertake method acts for querying for data using a query. The method acts undertaken by the computer include, for at least some data vectors in a data space, generating respective approximations in polar coordinates. Also, the method acts executed by the computer include returning "k" nearest neighbors to the query based on the approximations.

In a preferred embodiment, the method acts executed by the computer further include dividing the data space into plural cells, and approximating at least one data point in at least one cell by using polar coordinates with respect to the at least one cell. Accordingly, the method is referred to as "local polar coordinate-based approximation". In a particularly preferred embodiment, the data space has "d" dimensions, and a number of "b" bits to be assigned to each cell is determined. Then, the data space is divided into $2^{bd}$ cells.

As disclosed in greater detail below, each approximation defines a lower bound $d_{min}$ and an upper bound $d_{max}$, and the method acts executed by the computer include generating a candidate set of approximations based on the lower bound $d_{min}$ and upper bound $d_{max}$ of the approximations. Moreover, the query can be represented by a query vector q, and the computer adds a first approximation having a first lower bound $d_{min1}$ to the candidate set if $d_{min1} < k\text{-NN}^{dist}(q)$, wherein $k\text{-NN}^{dist}(q)$ is the $k^{th}$ largest distance between the query vector q and nearest neighbor vectors p encountered so far. The candidate set is then used to return "k" nearest neighbor vectors p to the query vector q. With this invention, not all vectors p corresponding to approximations in the candidate set are examined to return the "k" nearest neighbors.

In another aspect, a computer program product includes a program of instructions that have computer readable code means for generating local polar coordinate-based approximations of at least some data vectors p in at least one data set having a dimensionality of "d". The local polar coordinates are independent of "d". Computer readable code means use the approximations to return "k" nearest neighbors to a query.

In yet another aspect, a computer-implemented method is disclosed for finding, in a data space, "k" closest data vectors p to a query vector q. The method includes rendering approximations of at least some of the data vectors p using local polar coordinates, and filtering the approximations. After filtering, the "k" closest data vectors p are returned.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
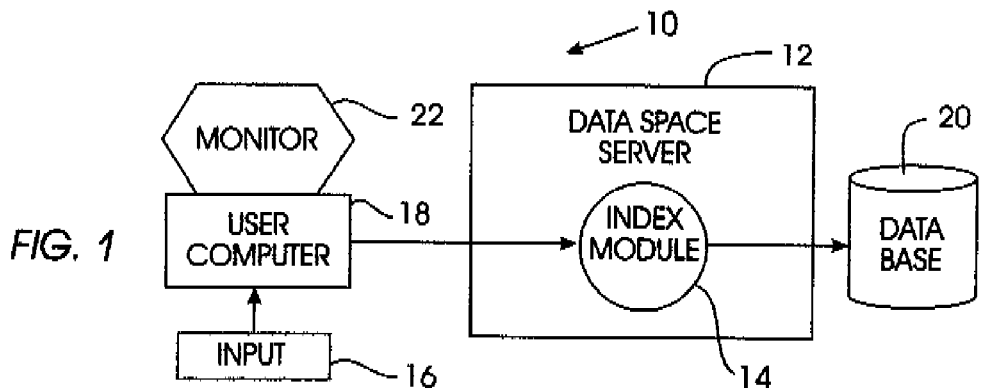
FIG. 1 is a block diagram of the present system.

Referring initially to FIG. 1, a system is shown, generally designated 10, that includes a data space server 12 having access to a local or remote software-implemented index module 14. Using an input device 16, a user of a user computer 18 can input a query for data from a database 20, and the server 12, by means of the index module 14, accesses the database 20 and returns the requested data to the user computer 18 for display or storage thereof on an output device, such as a monitor 22. More specifically, as set forth further below, the user computer 18 sends a query for data essentially using a query vector q, with the index module 14 returning the "k" nearest neighbors (referred to herein as the "k" data vectors p that are closest to q) in response. The query vector q can be, e.g., an example image for which the user wants close matches. Other applications of k-nearest neighbor searching are contemplated herein, such as but not limited to document retrieval, data mining, pattern classification, and machine learning.

As intended herein, either or both of the server 12/user computer 18 can be a server computer made by International Business Machines Corporation (IBM) of Armonk, N.Y. Other digital processors, however, may be used, such as personal computers, laptop computers, mainframe computers, palmtop computers, personal assistants, or any other suitable processing apparatus can be used. The input device 16 can be established by one or more of: a computer mouse, keyboards, keypads, trackballs, and voice recognition devices. Output devices other than the monitor 22 can be used, such as printers, other computers or data storage devices, and computer networks.

In any case, the processor of the server 12 accesses the module 14 to undertake the logic of the present invention, which may be executed by a processor as a series of computer-executable instructions. The instructions may be contained on a data storage device with a computer readable medium, such as a computer diskette having a computer usable medium with a program of instructions stored thereon. Or, the instructions may be stored on random access memory (RAM) of the computer, on a DASD array, or on magnetic tape, conventional hard disk drive, electronic read-only memory, optical storage device, or other appropriate data storage device. In an illustrative embodiment of the invention, the computer-executable instructions may be lines of C or C++ or Java code.

Indeed, the flow charts herein illustrate the structure of the logic of the present invention as embodied in computer program software. Those skilled in the art will appreciate that the flow charts illustrate the structures of computer program code elements including logic circuits on an integrated circuit, that function according to this invention. Manifestly, the invention is practiced in its essential embodiment by a machine component that renders the program code elements in a form that instructs a digital processing apparatus (that is, a computer) to perform a sequence of function steps corresponding to those shown.

Figure 2:
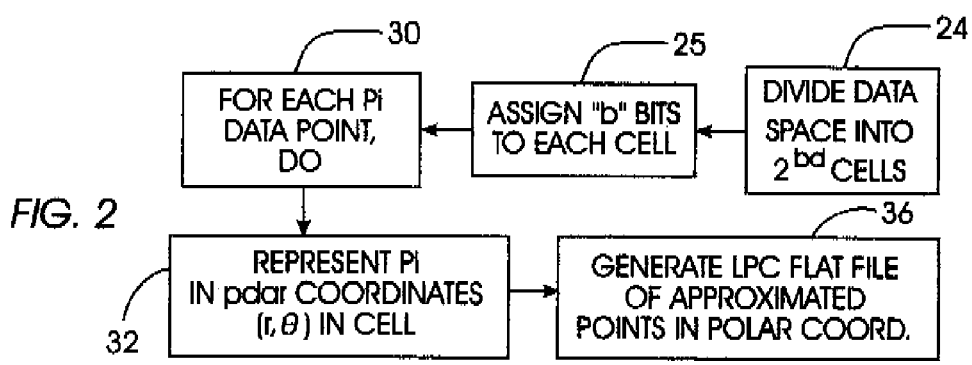
FIG. 2 is a flow chart of the logic for generating the LPC file.
Figure 3:
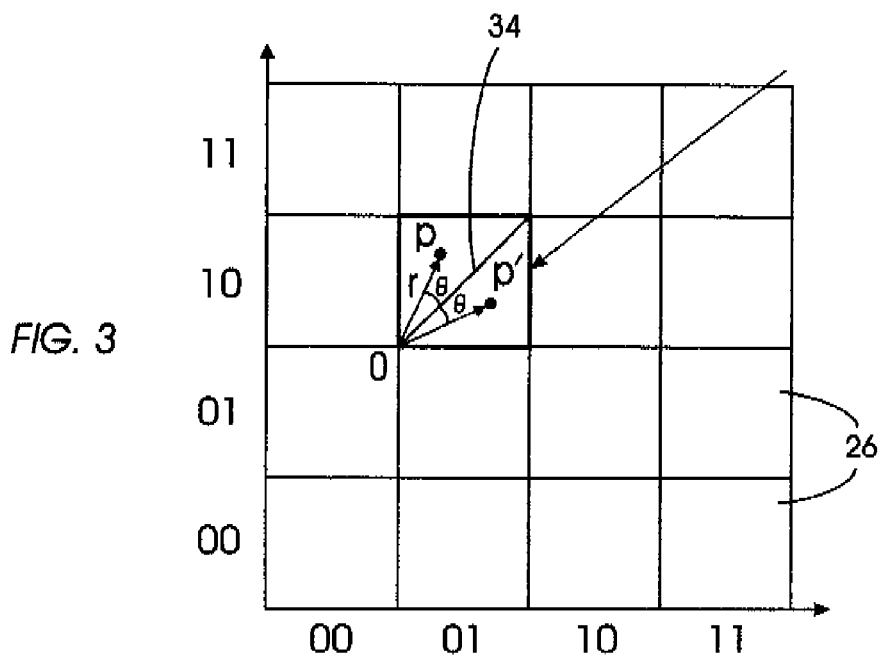
FIG. 3 is a graph schematically showing the data space cells with polar coordinates in two dimensions.
Figure 4:
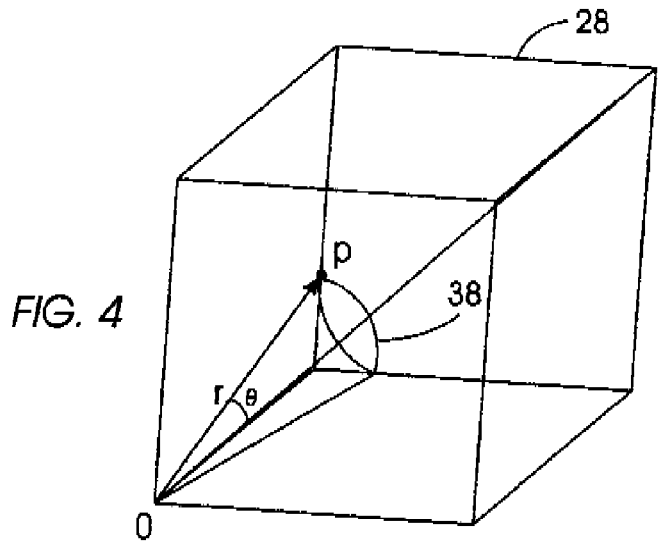
FIG. 4 is a graph schematically showing a single data space cell in three dimensions.

The logic of the present starts in FIG. 2 at blocks 24 and 25, wherein the data space in the database 20 is divided into $2^{bd}$ cells, wherein "b" is an integer number of data points that are assigned to each cell and "d" is the dimensionality of the database 20. For illustration purposes, FIG. 3 shows a two-dimensional data space that has been divided into plural cells 26, while FIG. 4 illustrates a single three dimensional cell 28. The use of two and three dimensions in FIGS. 2 and 3 is for simplicity of disclosure only, it being understood that the principles set forth herein apply to any high dimensional data spaces.

Moving to block 30, a DO loop is entered such that for each data point, an approximation in local polar coordinates is generated at block 32. As shown in FIG. 3, each cell 26 has a local origin "O" at its bottom left corner, and each cell can be represented by its coordinates shown in FIG. 3.

A vector $p_i$ is generated in local polar coordinates having a radius "r" from the cell's local origin "O" to the $i^{th}$ data point and an angle θ between the vector and the bisecting diagonal 34 of the cell. This is illustrated in FIGS. 3 and 4. As a result, each vector p is represented by an approximation a=<cell, radius "r", angle "θ">. At block 36, a complete local polar coordinate (LPC) file is generated, which in the preferred embodiment can be an array of approximations a representing vectors p.

As can be appreciated in reference to FIGS. 3 and 4, an approximation is a set of points having radius "r" and angle θ within a cell. In the two dimensional illustration shown in FIG. 3, the approximation represents two points p and p' which have polar coordinates (r, θ) and which are symmetric with respect to the diagonal 34. This is in contrast to the above-mentioned VA method, wherein the approximation would represent the entire cell. In the three dimensional illustration of FIG. 4, the approximation is represented by a circle 38 around the diagonal of the cell, whereas the above-mentioned VA file method would produce an approximation that would consist of the entire cube. Thus, it will readily be appreciated that the present method produces more efficient approximations than does the VA file method. In higher dimensions, an approximation in the present invention is a set of points on a hypersphere.

Figure 5:
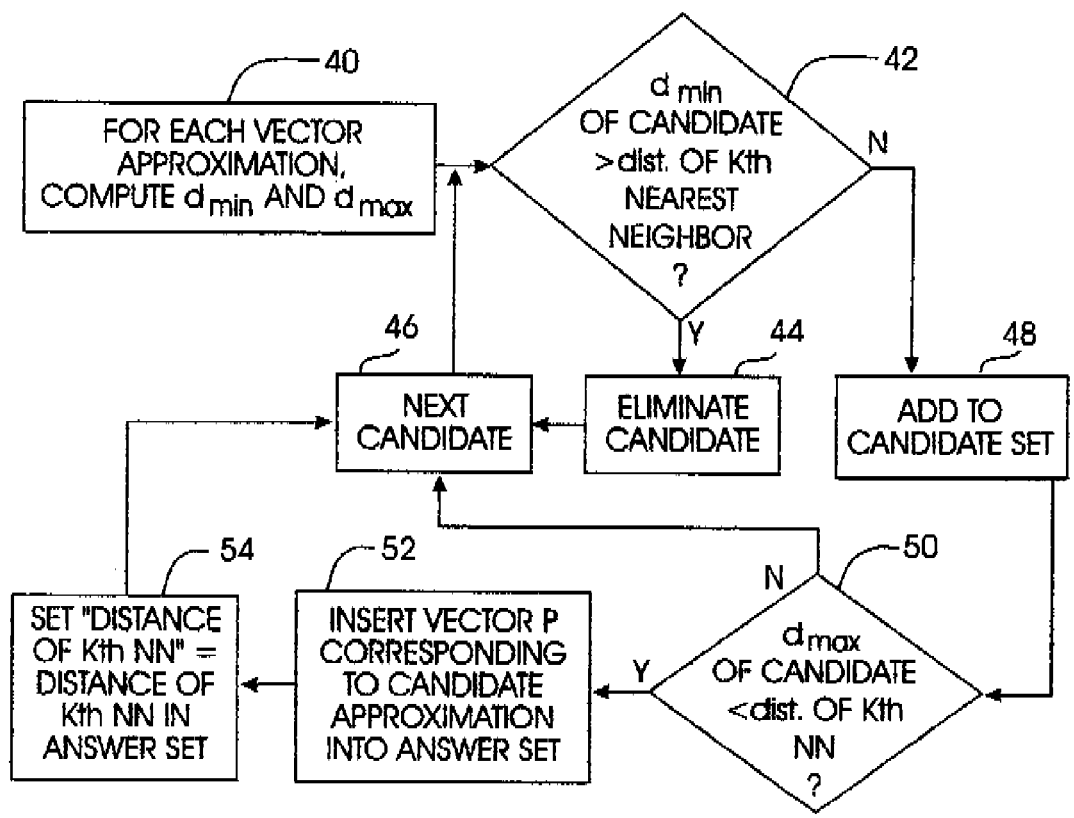
FIG. 5 is a flow chart showing the logic of generating the candidate set.
Figure 6:
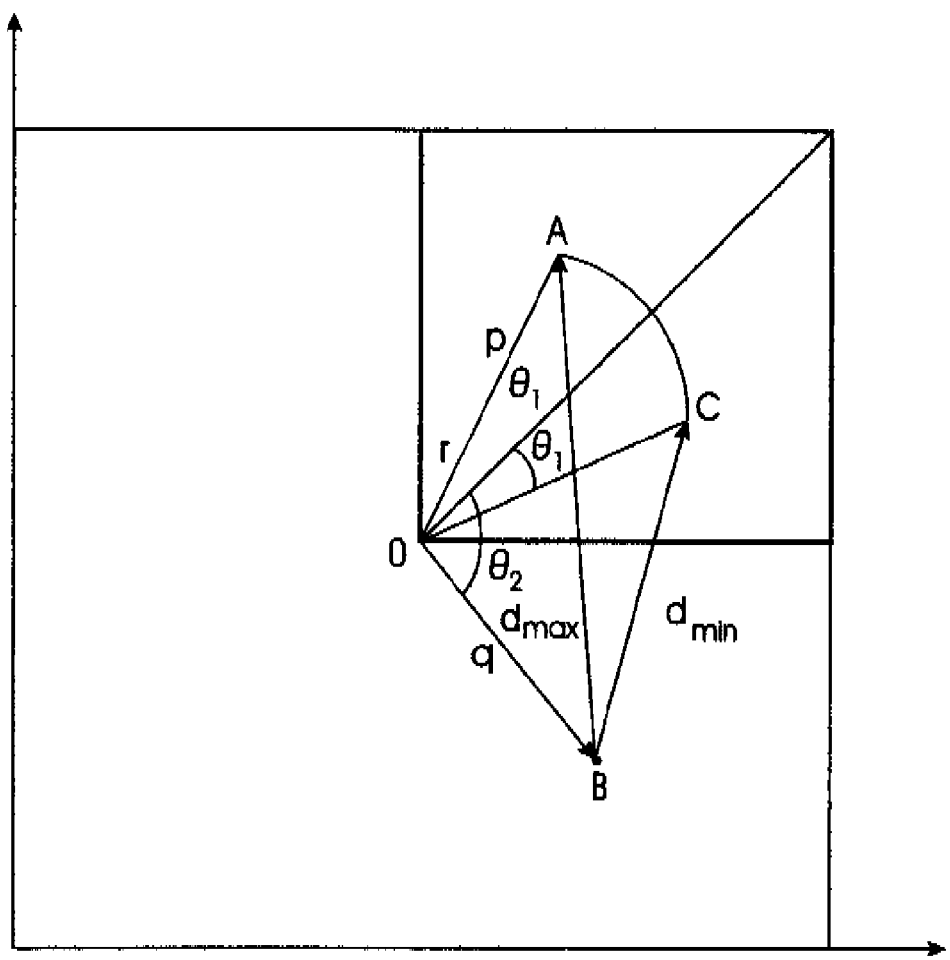
FIG. 6 is a graph schematically showing a data space cell with polar coordinates and minimum and maximum distances in two dimensions.
Figure 7:
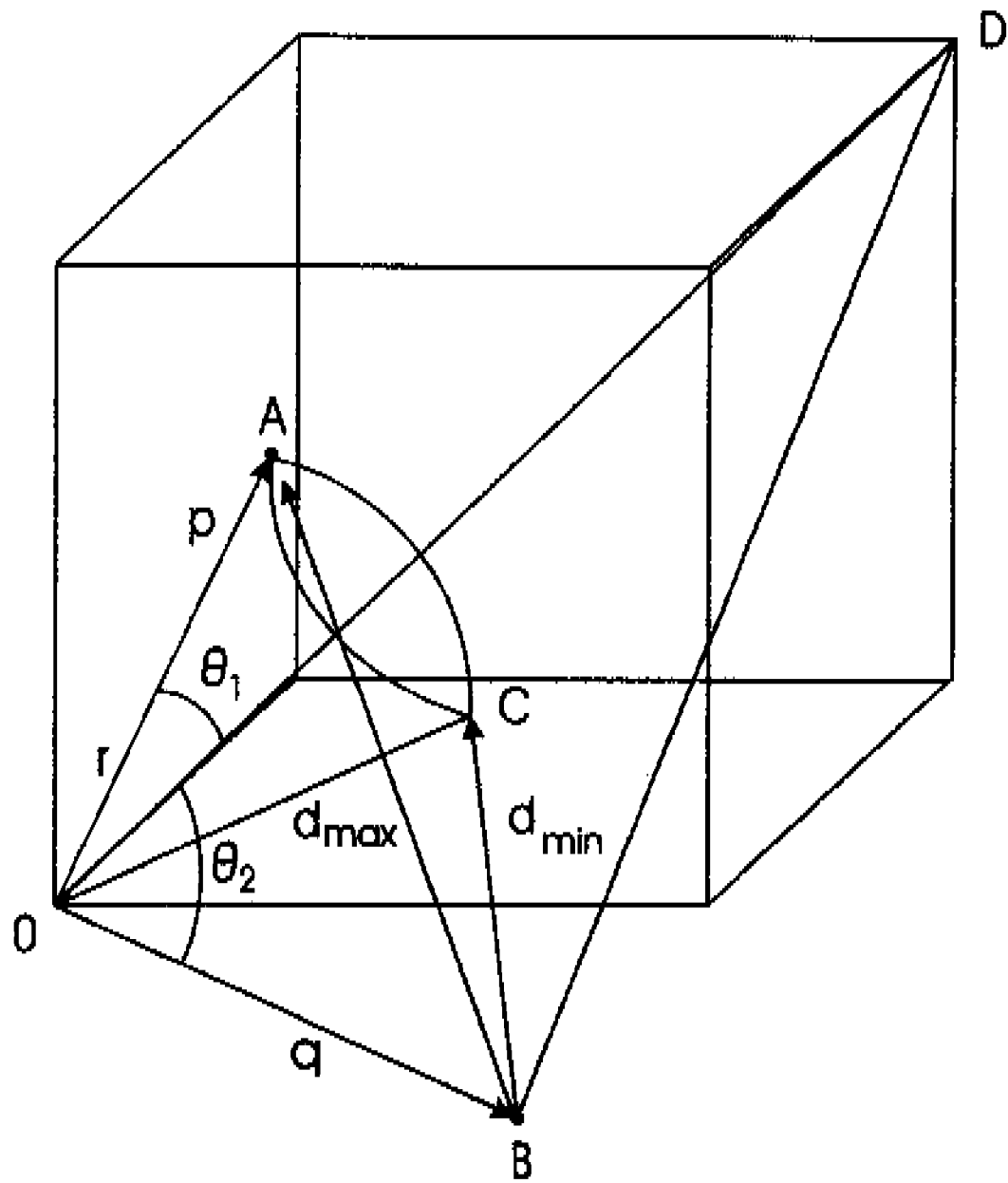
FIG. 7 is a graph schematically showing a data space cell with polar coordinates and minimum and maximum distances in three dimensions.

FIGS. 5-7 illustrate how the preferred LPC flat file generated at block 36 in FIG. 2 is used upon receipt of a query, represented by a query vector q. Commencing at block 40, a minimum distance $d_{min}$ and a maximum distance $d_{max}$ are computed for each approximation. These distances represent the minimum and maximum bounds, respectively, between the respective data vector p and query vector q. The minimum distance $d_{min}$ is equal to $[|p|^2+|q|^2-2|p||q|\cos(\theta_1-\theta_2)]^{1/2}$, wherein the angle $\theta_1$ is the angle between the cell diagonal and the data vector p and the angle $\theta_2$ is the angle between the cell diagonal and the query vector q, as shown in FIG. 6 for the two dimensional case and FIG. 7 for the three dimensional case. On the other hand, the maximum distance $d_{max}$ is equal to $[|p|^2+|q|^2-2|p||q|\cos(\theta_1+\theta_2)]^{1/2}$.

Without loss of generality, these properties hold for any number of dimensions. In the three dimensional case shown in FIG. 7, the point "A" (representing $d_{max}$), C (representing $d_{min}$), the origin "O", the point "B" (the endpoint of the query vector q), and the point "D" (the corner of the cell opposite to the origin "O") all lie in the same plane.

With the above understanding in mind, the logic moves from block 40 to decision diamond 42, wherein for the candidate near neighbor under test it is determined whether the corresponding minimum distance $d_{min}$ is greater than the $k^{th}$-largest distance k-NN$^{dist}$(q) between the query vector q and the data vectors p in an initially null answer set. The distance k-NN$^{dist}$(q) is initialized at an appropriate large value. This test can be thought of as a coarse test, which, if positive, leads to the immediate elimination of the candidate at block 44. The next candidate is retrieved at block 46, and the logic loops back to decision diamond 42 to test the next candidate.

On the other hand, if the candidate passes the test at decision diamond 42, indicating that the candidate might be a k-nearest neighbor, the candidate is added to a candidate set at block 48. Then, the candidate's maximum distance is compared to the $k^{th}$-largest distance k-NN$^{dist}$(q) at decision diamond 50, and if the candidate's maximum distance is equal to or greater than the $k^{th}$-largest distance k-NN$^{dist}$(q), the logic loops back to block 46 to retrieve the next candidate for test.

In contrast, if the candidate's maximum distance is less than the $k^{th}$-largest distance k-NN$^{dist}$(q), indicating that the candidate is probably one of the "k" near neighbors being sought, the data vector p that corresponds to the candidate is added to an answer set "knn" at block 52. The answer set "knn" can be ordered by distance between the query vector q and each data vector p in the set. Then, at block 54 the $k^{th}$-largest distance k-NN$^{dist}$(q) is potentially recomputed by setting it equal to the $k^{th}$-largest distance k-NN$^{dist}$(q) corresponding to the $k^{th}$ vector p in the answer set.

After the logic of FIG. 5, it will be appreciated that all candidate approximations have been tested, and most have been eliminated. In other words, most data points have been filtered out. Those that remain have been added to the candidate set, and the "best" of the candidates in the candidate set (as indicated by having a relatively small $d_{max}$) have been added to the answer set. The next stage of the logic is then commenced at block 56, wherein the $k^{th}$-largest distance k-NN$^{dist}$(q) is set equal to the maximum distance of the p vectors in the answer set "knn". Then, a DO loop is entered at block 58 wherein the actual data points represented by the candidates in the candidate set are scanned in increasing order of distance. The next candidate is retrieved at block 60, and at decision diamond 62 the distance between the data vector p under test and the query vector q is compared to the $k^{th}$-largest distance k-NN$^{dist}$(q). If it is not less than k-NN$^{dist}$(q), the logic loops back to block 60 to retrieve the next candidate in the candidate set. On the other hand, if the candidate passes the test at decision diamond 62, it is inserted into the answer set "knn" at block 64, and the $k^{th}$-largest distance k-NN$^{dist}$(q) is recomputed at block 66. The next candidate is then retrieved at block 60 for test. Owing to the ordering by distance in the candidate set and answer set, the logic can end when the lower bound $d_{min}$ of a candidate is encountered which exceeds the k-th distance k-NN$^{dist}$(q), such that not all candidates in the candidate set need be tested.

Figure 8:
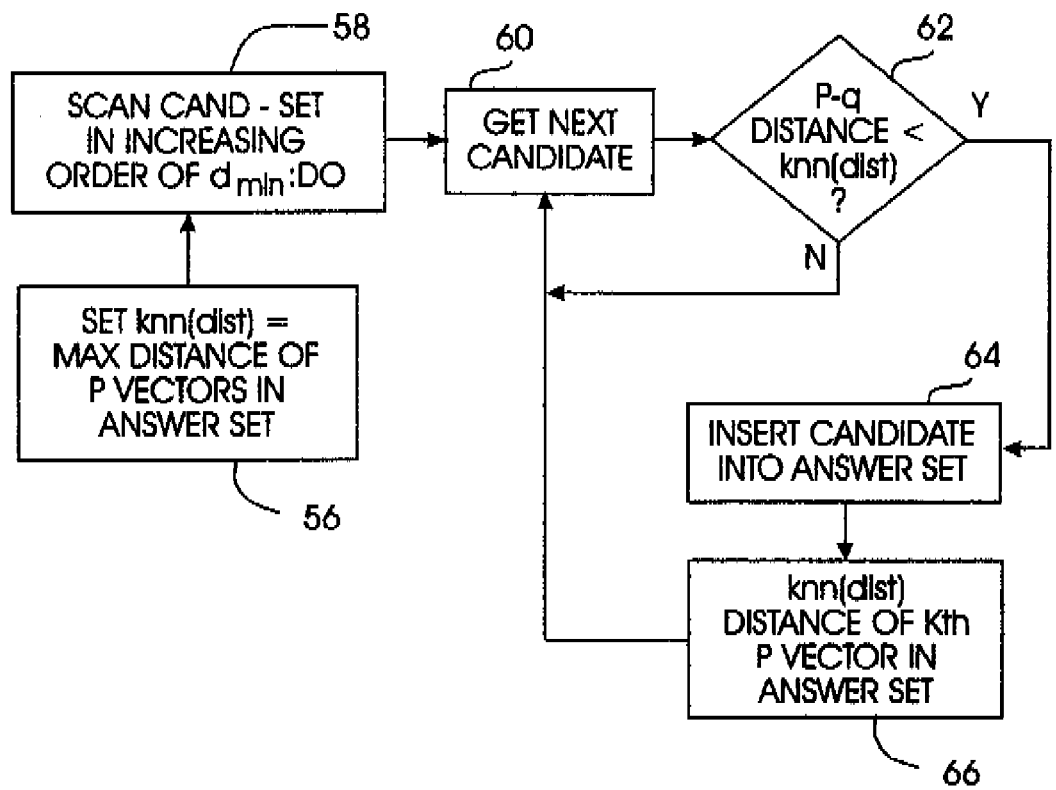
FIG. 8 is a flow chart showing the logic of finding the "k" nearest neighbors to a query "q" using the candidate set.

A pseudocode representation (with comments) of the logic of FIGS. 5 and 8 is as follows:

```
Algorithm k_NN_Search (q: vector, k: integer)
{
// Variables used in the algorithm
// k-NN^dist(q): the k-th largest distance between the query vector q and the vectors p encountered
so far
// N: the number of vectors in the database
// knn: answer list to maintain the nearest k vectors encountered so far and their distances to the
query vector q
// cand_list: min heap to maintain the candidate set
// c: a candidate to insert into the cand_list
// c.oid: identifier assigned to uniquely identify the candidate c.
// nn: a near neighbor to insert into the knn
// MAX: a value that exceeds the possible largest distance between any two points within the
database.
// Stage 1
// The primary purpose of this stage is to build the cand_list for stage 2. For this purpose we
use k-NN^dist(q)
// whose initial value is the possible largest distance between any two points within the database.
The value of
// k-NN^dist(q) is updated dynamically as new candidates are inserted to the cand_list.
        for i:=0 to k do {
                knn[i].dist := MAX;
        }
        k-NN^dist(q) := MAX;
                For every approximation a in the approximation set {
                        Compute the lower and upper bounds a.d_min and a.d_max of a.
                        if (a.d_min ≦ k-NN^dist(q)) {
                                Insert [c := {a.oid, a.d_min, a.d_max}] to the candidate set cand_list;
                                if (c.d_max < k-NN^dist(q)) {
                                        // The following is an ordered insertion in the knn array, i.e., the new element is inserted
                                        // into the correct position with respect to the distance in knn.
                                        Insert the near neighbor [nn := {oid = c.oid, dist = c.d_max}] to the answer set knn;
                                        // Update k-NN^dist(q) after each insertion, if it gets smaller.
                                        k-NN^dist(q) := the distance of the k-th nearest neighbor in the answer set knn;
                                }
                        }
                }
```

```
// Stage 2
// Scan the cand_list in increasing order of d_min to find the k nearest neighbors to the query point q.
// The scanning procedure (while procedure in the code) ends when the lower bound (c.d_min) of the
// candidate c is encountered which exceeds the k-th distance k-NN^dist(q) in the answer set.
for i:=0 to k do {
        knn[i].dist := MAX;
}
        while (get the candidate c from the candidate set cand_list and c.d_min ≤ k-NN^dist(q)) do {
            Read vector p corresponding to the c.oid;
            if (L_2 (p, q) < k-NN^dist(q)) {
                Insert the near neighbor [nn := {oid = c.oid, dist = L_2 (p, q)}] to the answer set knn.
                k-NN^dist(q) := the distance of the k-th nearest neighbor in the answer set knn;
            }
        }
}
```

While the particular INDEXING SYSTEM AND METHOD FOR NEAREST NEIGHBOR SEARCHES IN HIGH DIMENSIONAL DATA SPACES as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act".

We claim:

1. A computer-implemented method for finding, in a data space, "k" closest data vectors p to a query vector q, comprising:

using a computer, rendering approximations of at least some of the data vectors p using local polar coordinates;

using the computer, filtering the approximations; and after filtering, returning the "k" closest data vectors p, wherein a $k^{th}$-largest distance is set equal to a maximum distance associated with data vectors p in an answer set "knn", actual data points represented by candidate vectors in a candidate set being scanned in increasing order of distance such that a candidate vector is retrieved and a distance between the candidate vector and the query vector q is compared to the $k^{th}$-largest distance, and if the distance between the candidate vector and the query vector q is not less than $k^{th}$-largest distance, a next candidate vector in the candidate set is retrieved, otherwise the candidate vector is inserted into the answer set "knn" and the $k^{th}$-largest distance is recomputed, further comprising:

dividing the data space into plural cells;

representing each approximation in polar coordinates with respect to one of the cells, wherein the data space has "d" dimensions and the method further comprises:

determining a number of "b" bits to be assigned to each cell; and dividing the data space into $2^{bd}$ cells.

* * * * *